(12) United States Patent
Tai et al.

(10) Patent No.: US 7,456,908 B2
(45) Date of Patent: Nov. 25, 2008

(54) METHOD OF PERFORMING CONVERGENCE CALIBRATION FOR A DISPLAY

(75) Inventors: Wen-Chih Tai, Taipei Hsien (TW);
Ming-Tsung Ho, Taipei Hsien (TW);
Chia-Lin Liu, Tai-Chung Hsien (TW);
Chi-Neng Mo, Tao-Yuan Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 568 days.

(21) Appl. No.: 11/162,293

(22) Filed: Sep. 6, 2005

(65) Prior Publication Data
US 2007/0052870 A1 Mar. 8, 2007

(51) Int. Cl.
*H04N 3/36* (2006.01)
*H04N 9/28* (2006.01)

(52) U.S. Cl. ........................ 348/745; 348/191

(58) Field of Classification Search ......... 348/745–747, 348/181, 189, 177, 806, 807, 190
See application file for complete search history.

(56) References Cited

U.S. PATENT DOCUMENTS

| | | | | |
|---|---|---|---|---|
| 4,085,425 A | * | 4/1978 | Hamill | 348/747 |
| 6,100,926 A | * | 8/2000 | Kawashima | 348/181 |
| 6,330,040 B1 | | 12/2001 | Kawashima | |
| 6,499,849 B1 | | 12/2002 | Huang | |
| 6,686,973 B2 | | 2/2004 | Su | |
| 7,061,551 B2 | * | 6/2006 | Shim | 348/745 |
| 2002/0015113 A1 | | 2/2002 | Chauvin et al. | |
| 2003/0030757 A1 | | 2/2003 | Shim | |
| 2003/0156229 A1 | * | 8/2003 | Samman et al. | 348/745 |

FOREIGN PATENT DOCUMENTS

| | | |
|---|---|---|
| TW | 312764 | 8/1997 |
| TW | 480362 | 3/2002 |

* cited by examiner

*Primary Examiner*—M. Lee
(74) *Attorney, Agent, or Firm*—Winston Hsu

(57) ABSTRACT

A convergence calibration method for a display includes generating a test pattern of similar width with respect to a sensor and expanding the area of the test pattern from one side of the sensor until the whole sensor is illuminated. During the process of expanding the test pattern, the sensor continues to measure signals from the test patterns. Based on the maximum energy measured by the sensor, a digital judgment is performed for calculating convergence parameters.

18 Claims, 12 Drawing Sheets

METHOD OF PERFORMING CONVERGENCE CALIBRATION FOR A DISPLAY

BACKGROUND OF THE INVENTION

1. Field of the Invention

The present invention relates to a convergence calibration method, and more particularly, to a convergence calibration method for a display using multiple beams to generate a video display on a screen.

2. Description of the Prior Art

Increasing demand for large screen televisions is giving rise to an expanding market for planar televisions. Advanced technologies overcome the obstacles of manufacturing large-scale planar displays and gradually lower the prices of the products. Therefore, large-scale planar displays, once appearing as expensive professional equipment, have found an increasing number of household applications, such as in home theaters. Various projection techniques aiming at providing better visual experience are constantly being researched and developed. Among them, rear projection displays feature high contrast, high brightness, large viewing angles, sharp picture definition and low geometrical distortion, and are therefore very competitive in the market.

A typical rear projection color television set includes three cathode ray tubes (CRTs), each CRT processing one of the primary colors: red, blue or green. By combining the three monochromatic beams, the set can produce full color television pictures. Please refer to FIG. 1 for a plan view of a rear projection television set 10. The rear projection television set 10 shown in FIG. 1 includes a red CRT 12, a lens 22, a mirror 18, a base module 19, and a screen 20. The rear projection television set 10 further includes another two CRTs and corresponding lenses for each CRT, although for clarity, only a single CRT (the red CRT 12) and a single lens (the lens 22) are shown in FIG. 1. The light from the red CRT 12 passes through the lens 22 and illuminates the mirror 18, which in turn reflects the light onto the screen 20 for observation by the viewer.

Please refer to FIG. 2 illustrating the relationship between the three CRTs of the rear projection television set 10. The rear projection television set 10 include the red CRT 12, a green CRT 14, a blue CRT 16 and lenses 22, 24, 26. As can be seen in the figure, CRTs 12, 14 and 16 are matched respectively with lenses 22, 24 and 26. The rear projection television set 10 sends a red color signal R, a green color signal G and a blue color signal B of a display image to the red CRT 12, the green CRT 14, and the blue CRT 16, respectively. Color signals R, G, B are enlarged by the lenses 22, 24, 26 respectively. The enlarged color signals then illuminate the mirror 18, which in turn reflects the light onto the screen 20. By combining the three monochromatic beams of the color signals R, G, B, the rear projection television set 10 can produce full color images on the screen 20. In order to produce accurate pictures, proper alignment of the beams must be maintained. Based on the sizes of the base module 19 and the screen 20, the CRTs 12, 14, 16 and the lenses 22, 24, 26 are disposed at a certain angle with respect to the screen 20 so that their beams are focused at the same point on the screen.

However, the magnitude of the earth's magnetic field at the position where the rear projection television set 10 is installed and used is different from that of the earth's magnetic field at the position of the manufacturing production line, since the region and direction are different from each other. Accordingly, the change of the magnitude of the earth's magnetic field affects the precise forming of the picture of the rear projection television set 10. In other words, the change of the earth's magnetic field causes a distortion in the deflection degree of the cathode ray, thus the exact picture cannot be formed on the screen 20. Therefore, the rear projection television set 10 has a built-in convergence control circuit for compensating for the influence of the change of the earth's magnetic field.

Please refer to FIG. 3 for a prior art convergence calibration circuit 30 and FIG. 4 for a diagram illustrating a prior art method of performing convergence calibration by the convergence calibration circuit 30 disclosed in U.S. Pat. No. 6,330,040 to Kawashima, which is included herein by reference. In FIG. 3 sensors 64, 66, 68 and 70 are disposed around the screen 20, onto which test patterns are projected by a pattern generator 100 and CRTs 82, 84 and 86. An I/V converter 72 convert current signals measured by the sensors 64, 66, 68 and 70 from the test patterns into voltage signals, which in turn pass through a low-pass filter (LPF) 73 and are converted into digital signals by an analog-to-digital converter (ADC) 74. A controller 76 performs calculations for the convergence calibration and sends adjustment signals to a diffraction wave generator 78. Based on the received adjustment signals, the diffraction wave generator 78 generates driving signals for a yoke driver 80. The yoke driver 80 controls the CRTs 82, 84 and 86 until a correct adjustment value for the convergence calibration is acquired. As shown in FIG. 4, "O" and "X" represent the center of the screen 20 and the center of a testing matrix, respectively. When the CRTs 82, 84 and 86 project test patterns based on the correct adjustment value for the convergence calibration, "O" and "X" will be completely overlapped. Since the sensor output has a non-linear relationship with respect to the light wavelength, it also influences the accuracy of the prior art method shown in FIG. 3 and FIG. 4. Also, many peripheral circuits are required, making the convergence calibration very complicated.

Please refer to FIG. 5 for a prior art method of performing convergence calibration disclosed in US patent publication No. 20030030757 to Shim, which is included herein by reference. In FIG. 5, four optical sensors T1-T4 are disposed at an upper side, a left side, a lower side, and a right side of the screen 20, respectively, and predetermined reference patterns PH and PV are displayed on the screen 20. The reference patterns consist of a horizontal reference pattern PH displayed as a horizontal line, and a vertical reference pattern PV displayed as a vertical line. The horizontal reference pattern PH moves from an upper part of the screen 20 towards a lower part of the screen 20 as indicated by a vertical arrow, and the vertical reference pattern PV moves from a left part of the screen 20 to a right part of the screen 20 as indicated by a horizontal arrow. The optical sensors T1-T4 measure a luminance of the reference patterns PV and PH moving horizontally and vertically, respectively. Convergence calibration is then performed based on data measured by the sensors.

In the prior art method of performing convergence calibration illustrated in FIG. 3-5, the sensors measure luminance of the reference patterns when the reference patterns move across the sensors. The prior art method is largely influenced by background noises that interfere with actual signals of reference patterns. Therefore, the accuracy of convergence calibration is also affected. And since the sensor output has a non-linear relationship with respect to the light wavelength, the convergence calculation and adjustment are also influenced.

SUMMARY OF THE INVENTION

It is therefore a primary objective of the claimed invention to provide a method of performing convergence calibration in a display system in order to solve the above-mentioned problems.

The claimed invention discloses a method of performing convergence calibration comprising: (a) projecting a reference pattern onto a sensor having a plurality of sensing sections and expanding a first area of the reference pattern from a first side of the sensor, (b) measuring first image signals with the plurality of sensing sections of the sensor from the reference pattern while performing step (a), (c) outputting first image signals measured by each of the plurality of sensing sections of the sensor in step (b), (d) projecting a reference pattern onto the sensor and expanding a second area of the reference pattern from a second side of a sensor, (e) measuring second image signals with the plurality of sensing sections of the sensor from the reference pattern while performing step (d), (f) outputting second image signals measured by each of the plurality of sensing sections of the sensor in step (e), and (g) generating parameters of the display system based on the first and second image signals outputted in step (c) and (f) for adjusting images of the display.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
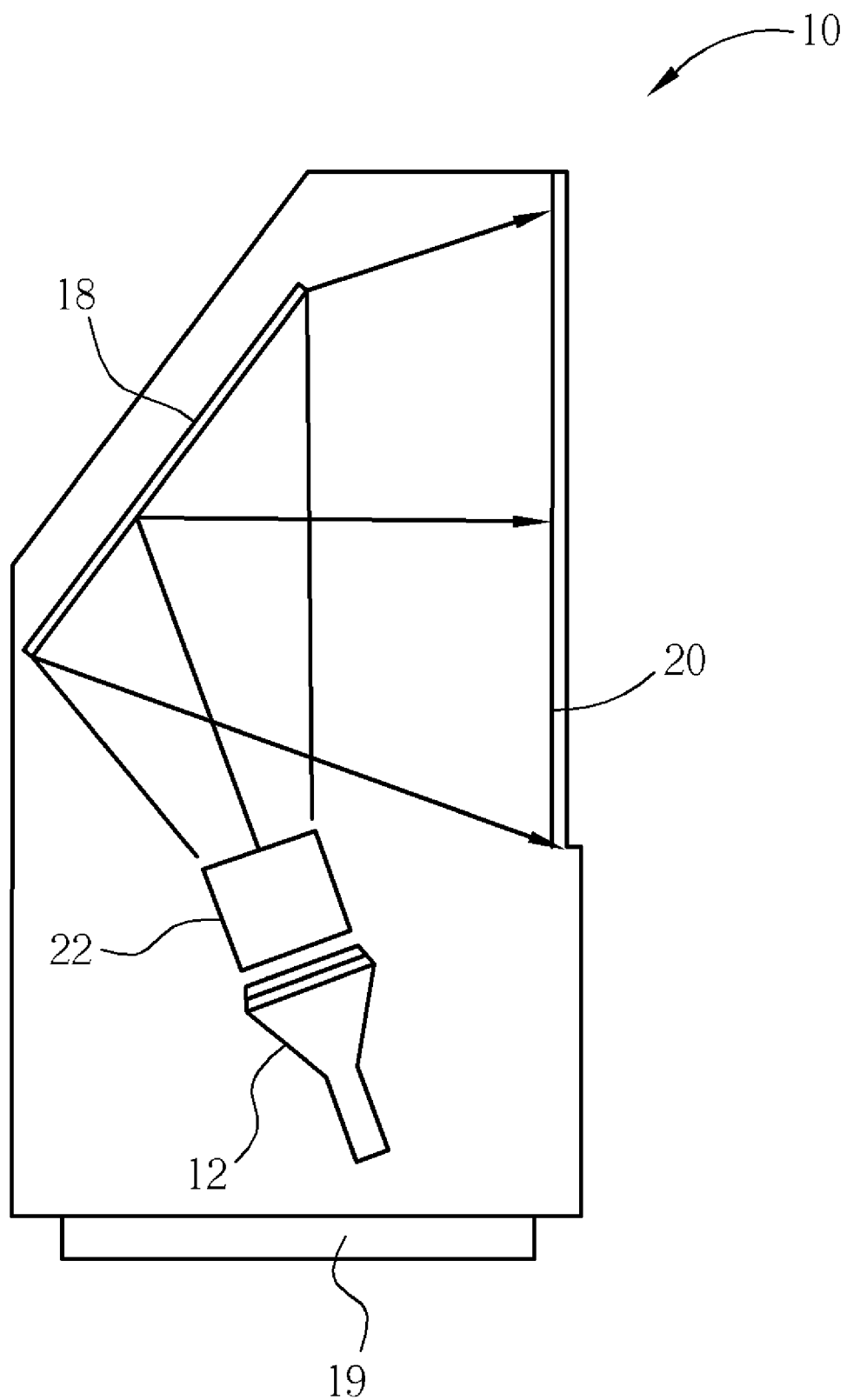
FIG. 1 is a plan view of a rear projection television set.
Figure 2:
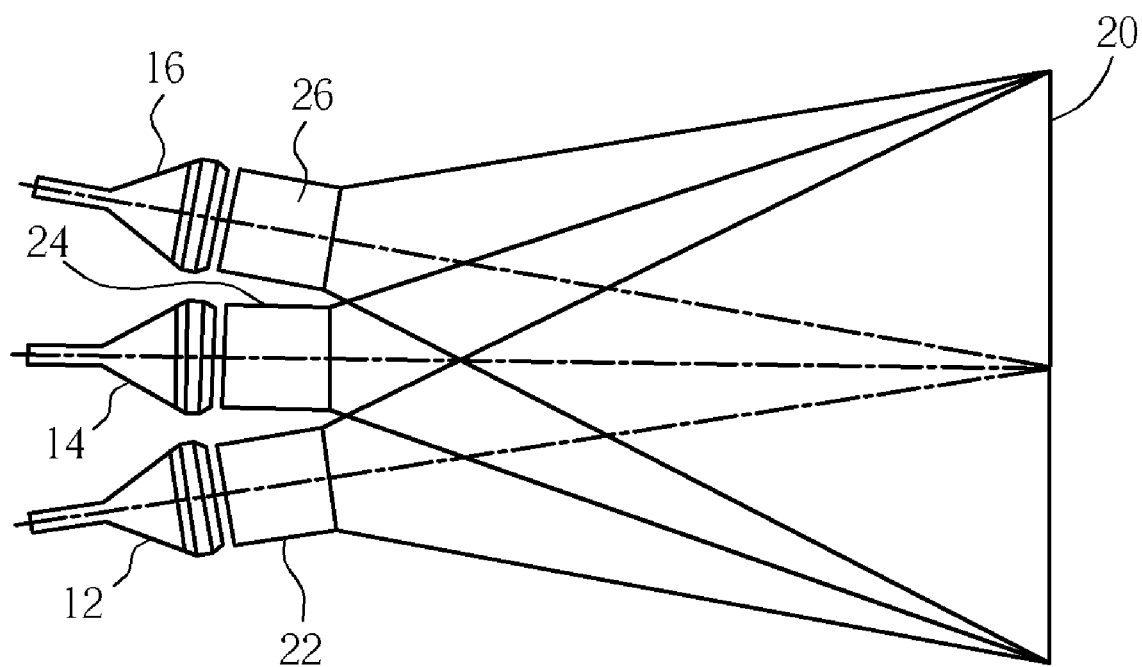
FIG. 2 is a diagram illustrating the relationship between the three CRTs of the rear projection television set in FIG. 1.
Figure 3:
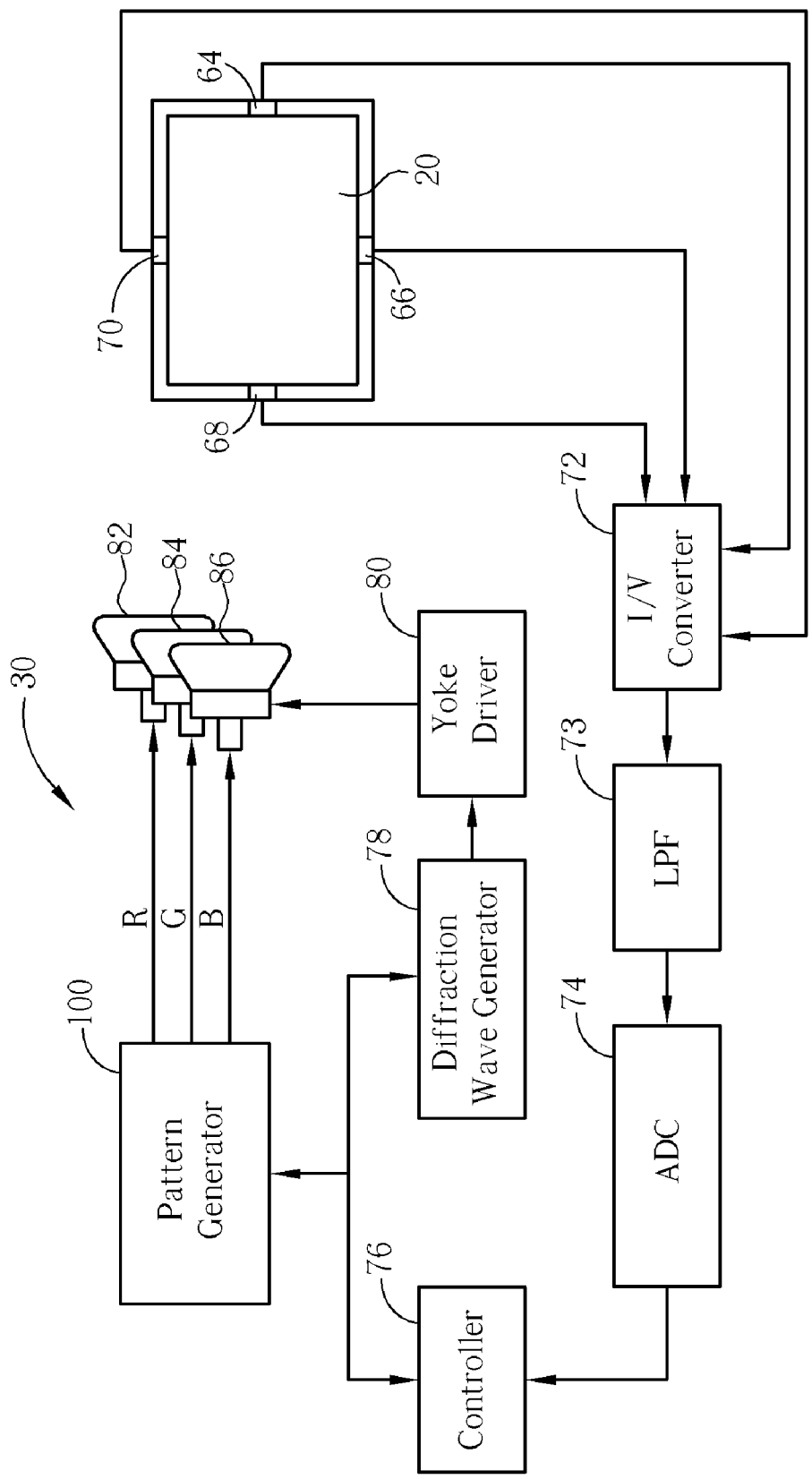
FIG. 3 shows a prior art convergence calibration circuit.
Figure 4:
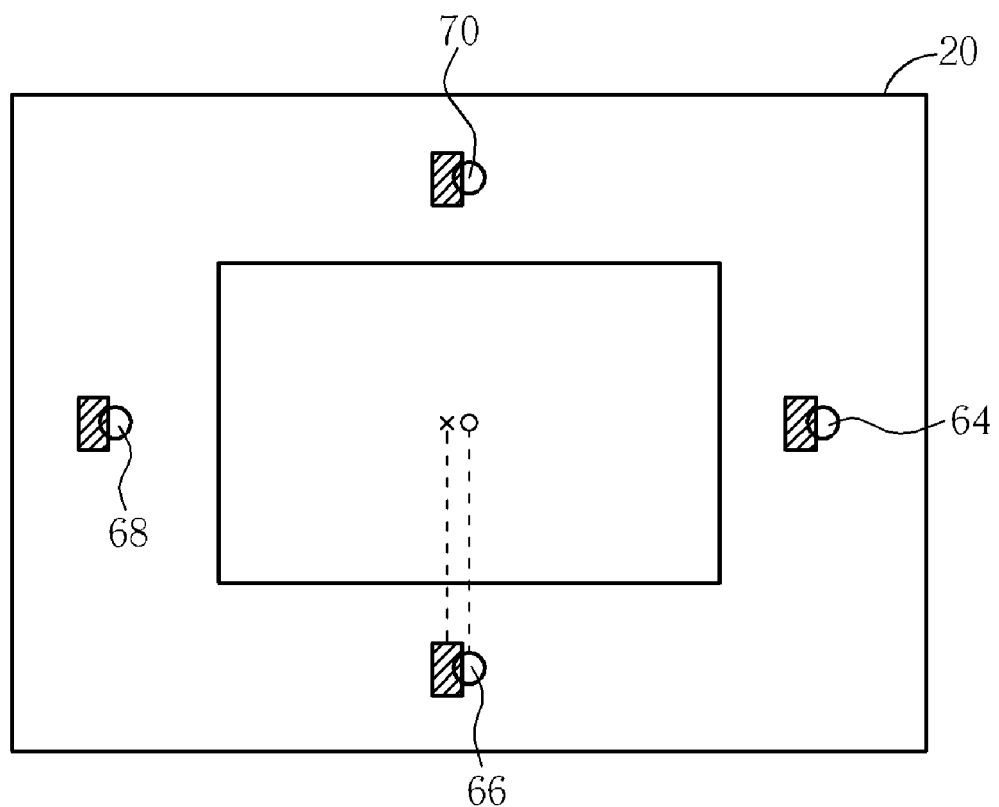
FIG. 4 is a diagram illustrating a prior art convergence calibration method according to FIG. 3.
Figure 5:
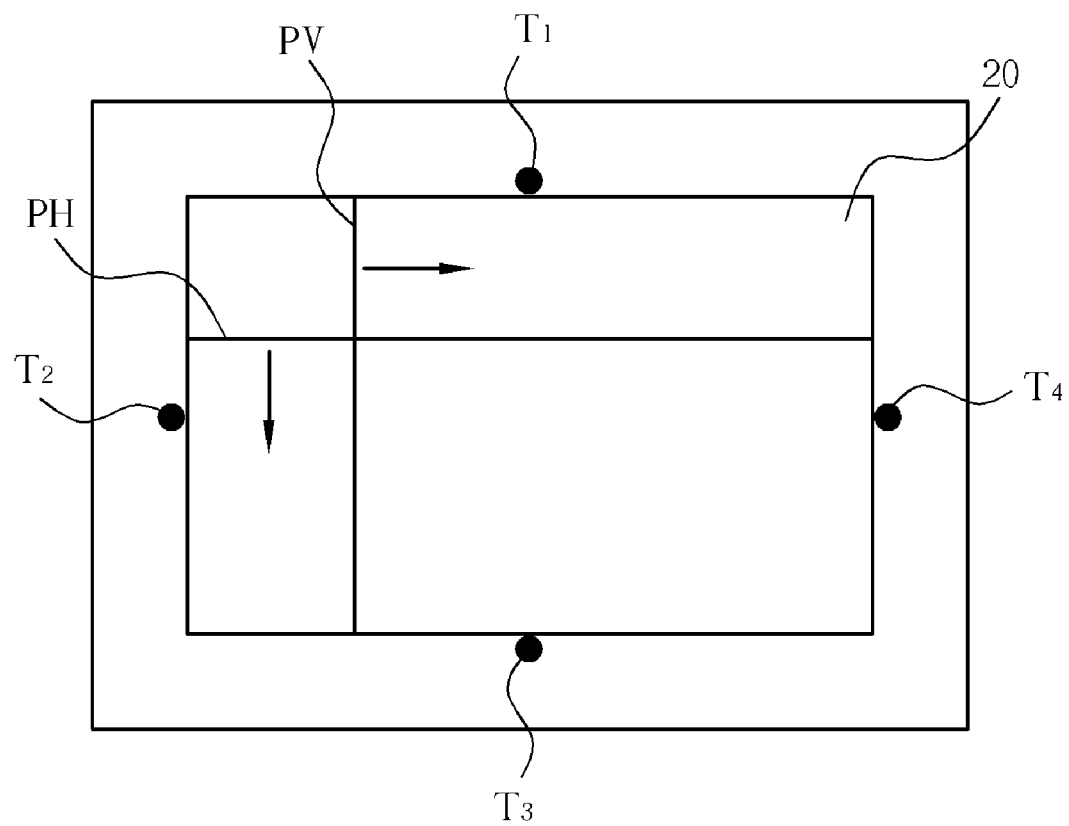
FIG. 5 is a diagram illustrating another prior art convergence calibration method.
Figure 6:
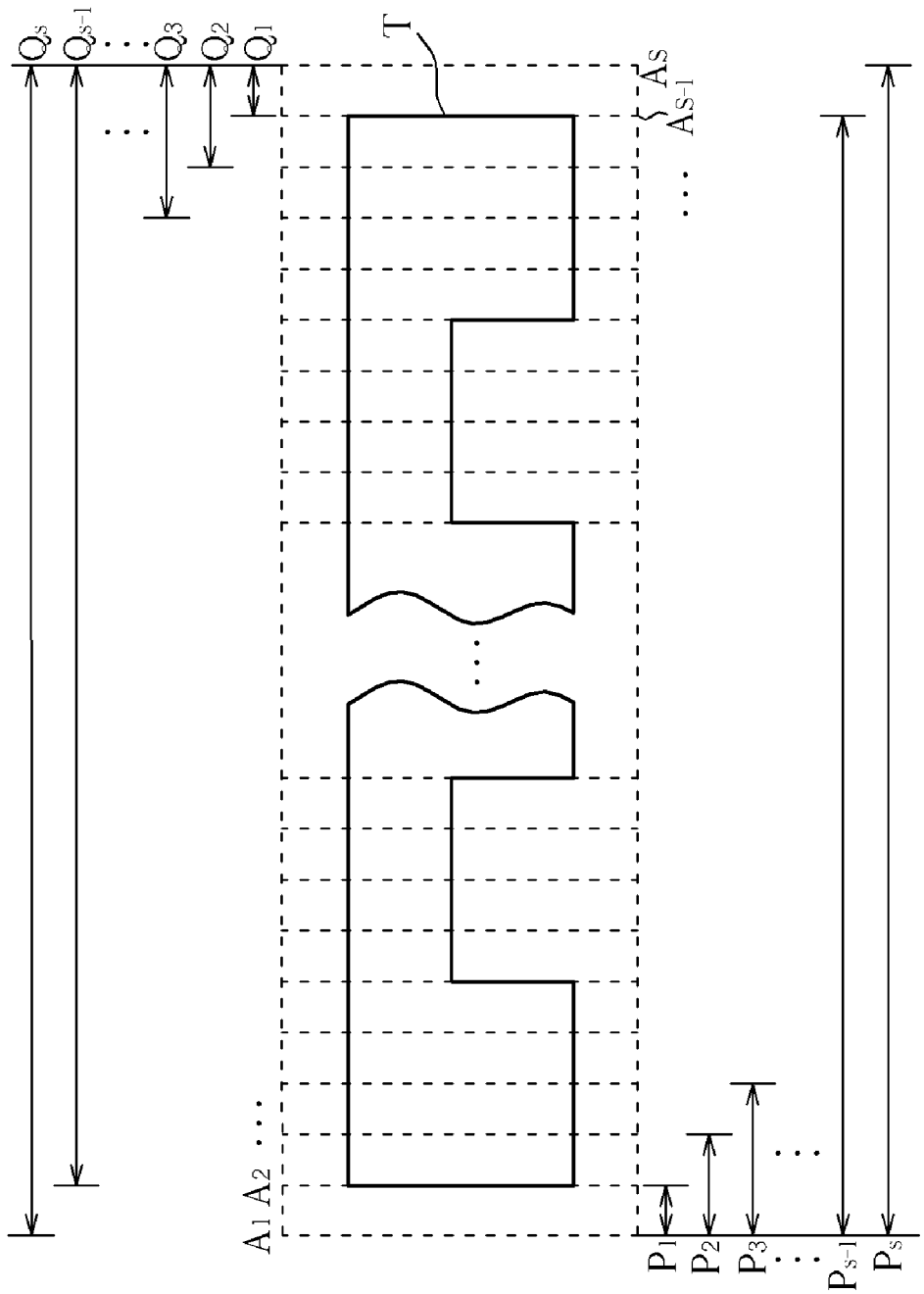
FIG. 6 is a diagram illustrating a convergence calibration method according to the present invention.

The present invention convergence calibration method generates a test pattern of similar width with respect to a sensor and expands the area of the test pattern from one side of the sensor until the whole sensor is illuminated. Please refer to FIG. 6 for a diagram illustrating the process of generating test patterns according to the present invention. If a sensor T is disposed at the upper side or the lower side of the screen 20, P1 represents an initial test pattern generated at the left side of the sensor T, and P2-Ps represent test patterns after expanding P1 from the left side of the sensor T to a plurality of predetermined locations A2-As, respectively. Similarly, Q1 represents an initial test pattern generated at the right side of the sensor T, and Q2-Qs represent test patterns after expanding Q1 from the right side of the sensor T to the plurality of predetermined locations As-A2, respectively. As shown in FIG. 6, test patterns Ps and Qs illuminate the whole sensor. During convergence operations, the sensor T measures luminance of the test patterns P1-Ps and Q1-Qs, and generate corresponding analog signals, usually voltage signals, which are then passed to an analog-to-digital converter (A/D converter). The A/D converter receives the signals and converts them to digital voltage signals, which are then passed to a micro computer unit in order to calculate convergence parameters.

The output voltage measured from test patterns is proportional to the illuminated area of the sensor T. The voltage sensitivity map can be regarded as an analog function i(x, y), which specifies the illumination to voltage intensity at each position coordinate (x, y) on the sensor T. As mentioned before, if the voltage is processed with a micro computer unit, the analog signal must be converted to an equivalent digital representation. The spatial coordinates (x, y) are sampled at discrete intervals $\Delta x$ and $\Delta y$ and represented as digital coordinates ($k\Delta x$, $j\Delta y$). If there are m samples along the x coordinate and n samples along the y coordinate, the results in a sensor will be m*n elements. The value of the voltage associated with the elements in row k and column j will be the average intensity of the elements and can be represented by the following equation:

$$V(k, j) = \frac{\int_0^{\Delta x} \int_0^{\Delta y} i((k-1)\Delta x + x, (j-1)\Delta y + y) dy dx}{\Delta x \Delta y}$$

The sensor T has only one voltage output signal at a measuring time, which is the summation of the illuminated elements. If the light beam covers all the sensor elements, such as from test patterns Ps and Qs, the maximum output voltage Vmax can be represented by the following equation:

$$V\max = \sum_{k=1}^{m} \sum_{j=1}^{n} V(k, j)$$

Figure 7:
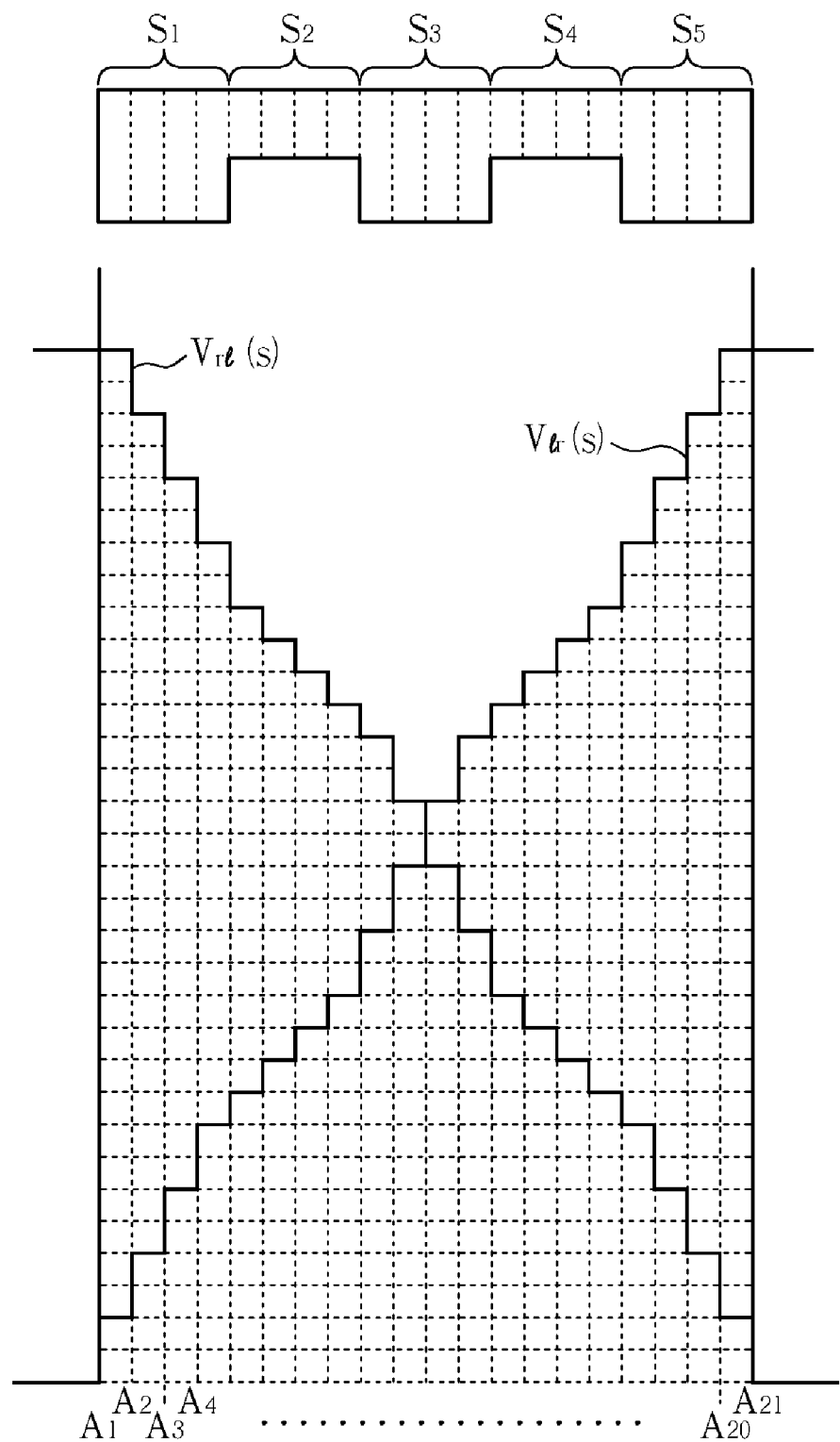
FIG. 7 is a diagram illustrating voltages measured during the present convergence calibration method.

Please refer to FIG. 7 for a diagram illustrating voltages measured by the sensor T. $V_{lr}(s)$ and $V_{rl}(s)$ represent voltages measured by the sensor T from the test patterns P1-Ps and Q1-Qs, respectively. $V_{lr}(s)$ and $V_{rl}(s)$ can be represented by the following equations:

$$Vlr(s) = \sum_{k=1}^{s} \sum_{j=1}^{n} V(k, j)$$

$$Vrl(s) = \sum_{k=s}^{m} \sum_{j=1}^{n} V(k, j)$$

where s denotes one of the predetermined locations A1-As.

In the embodiment shown in FIG. 7, predetermined locations A1-A21 are designated based on the area of the sensor T, and the distances between two neighboring predetermined locations are the same. Therefore, the sensor T measures luminance of test patterns at 21 intervals while expanding test patterns from P1 to P21 and from Q1 to Q21. Test patterns are expanded in the horizontal direction in FIG. 7 and the width in the vertical direction remains unchanged. Since the distances between two neighboring predetermined locations are the same, a test pattern gains the same amount of extra illuminating area after each expanding interval defined by A1-A21. In FIG. 7, the x-axis represents the location of a test pattern to which the test pattern extends from one side of the sensor, and the y-axis represents voltages measured by the sensor. For example, $V_{lr}(3)$ represents the voltage measured by the sensor from the test pattern P3 which has expanded from the left side of the sensor to the predetermined location A3. During the convergence calibration method shown in FIG. 7, the sensor measures 21 voltages from the test patterns P1-P21 when the illuminated area of the sensor T increases from its left side to its right side, and 21 voltages from the test patterns Q1-Q21 when the illuminated area of the sensor T increases from its right side to its left side. Since the areas of the test patterns have the following relationships: P1<P2<...<P21 and Q1<Q2<...<Q21, the measured voltages have the following relationships: $V_{lr}(1)<V_{lr}(2)<...<V_{lr}(21)$ and $V_{rl}(1)<V_{rl}(2)<...<V_{rl}(21)$.

In the embodiment shown in FIG. 7, the sensor T is of a predetermined shape and includes five sensing regions S1-S5. The sensing regions S1, S3 and S5 are twice the size of the sensing regions S2 and S4. Therefore, when a fixed test pattern is projecting on each sensing region, voltages measured by the sensing regions S1, S3 and S5 are twice the value of voltages measured by the sensing regions S2 and S4. When the test pattern expands from P1 to P5, from P10 to P13 and from P18 to P21, the extra illuminating areas projected on the sensor T are located within the sensing regions S1, S3 and S5, respectively, and after each expanding interval, the measure voltage increases by two units. However, when the test pattern expands from P6 to P9 and from P14 to P19, the extra illuminating areas projected on the sensor T are located within the sensing regions S2 and S4, respectively, and after each expanding interval, the measure voltage only increases by one unit.

After obtaining $V_{lr}(s)$ and $V_{rl}(s)$, various reference coordinates regarding the screen at the location where the sensor T is disposed can be calculated. These reference coordinates are then inputted into a convergence calibration circuit for calculating convergence parameters of the screen. Taking the peak sensing location of the sensor T for example, a function $U(q)$ is defined as the sum of $V_{lr}(s)$ and $V_{rl}(s+q)$, represented by the following equation:

$$U(q) = V_{lr}(s) + V_{rl}(s+q)$$
$$= \sum_{k=1}^{s}\sum_{j=1}^{n}V(k,j) + \sum_{k=s+q}^{m}\sum_{j=1}^{n}V(k,j)$$
$$= \sum_{k=1}^{m}\sum_{j=1}^{n}V(k,j) + \sum_{k=s}^{s+q}\sum_{j=1}^{n}V(k,j)$$
$$= V\max + \sum_{k=s}^{s+q}\sum_{j=1}^{n}V(k,j)$$

where $V_{rl}(s+q)$ is obtained by shifting $V_{rl}(s)$ in the x-axis direction by q units.

Figure 8:
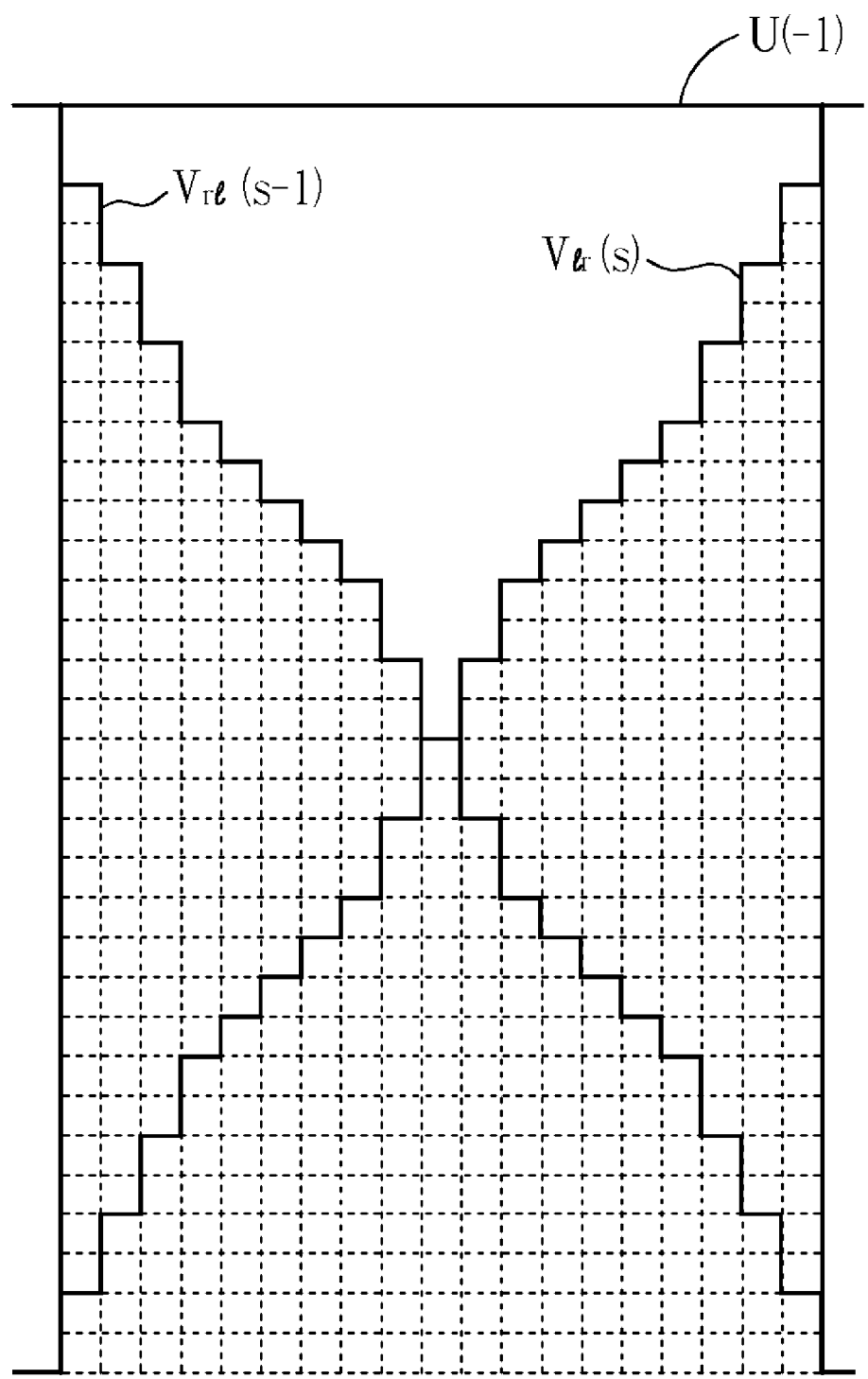
FIG. 8-FIG. 12 are diagrams illustrating calculations of convergence parameters according to the present invention.
Figure 9:
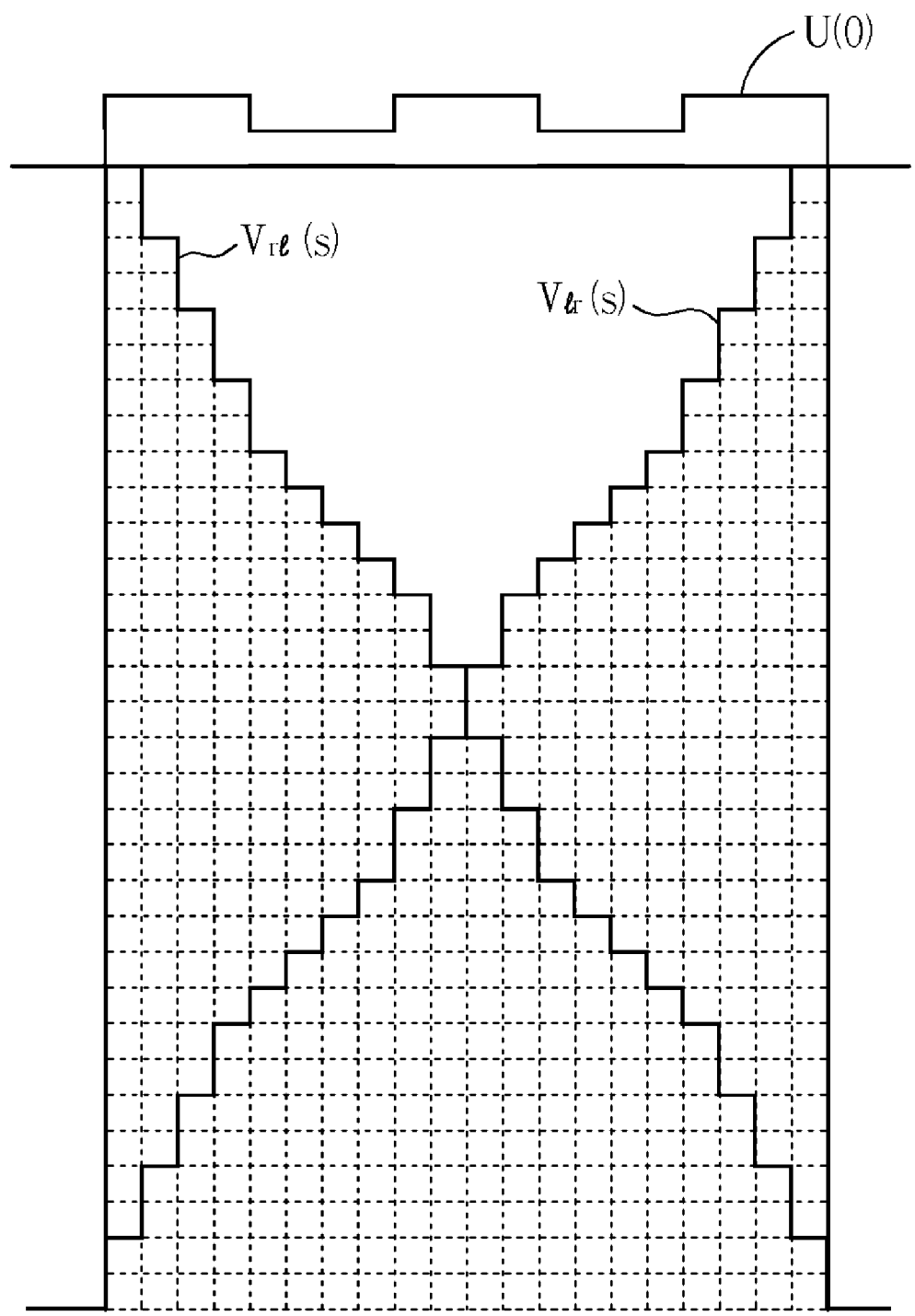
Figure 10:
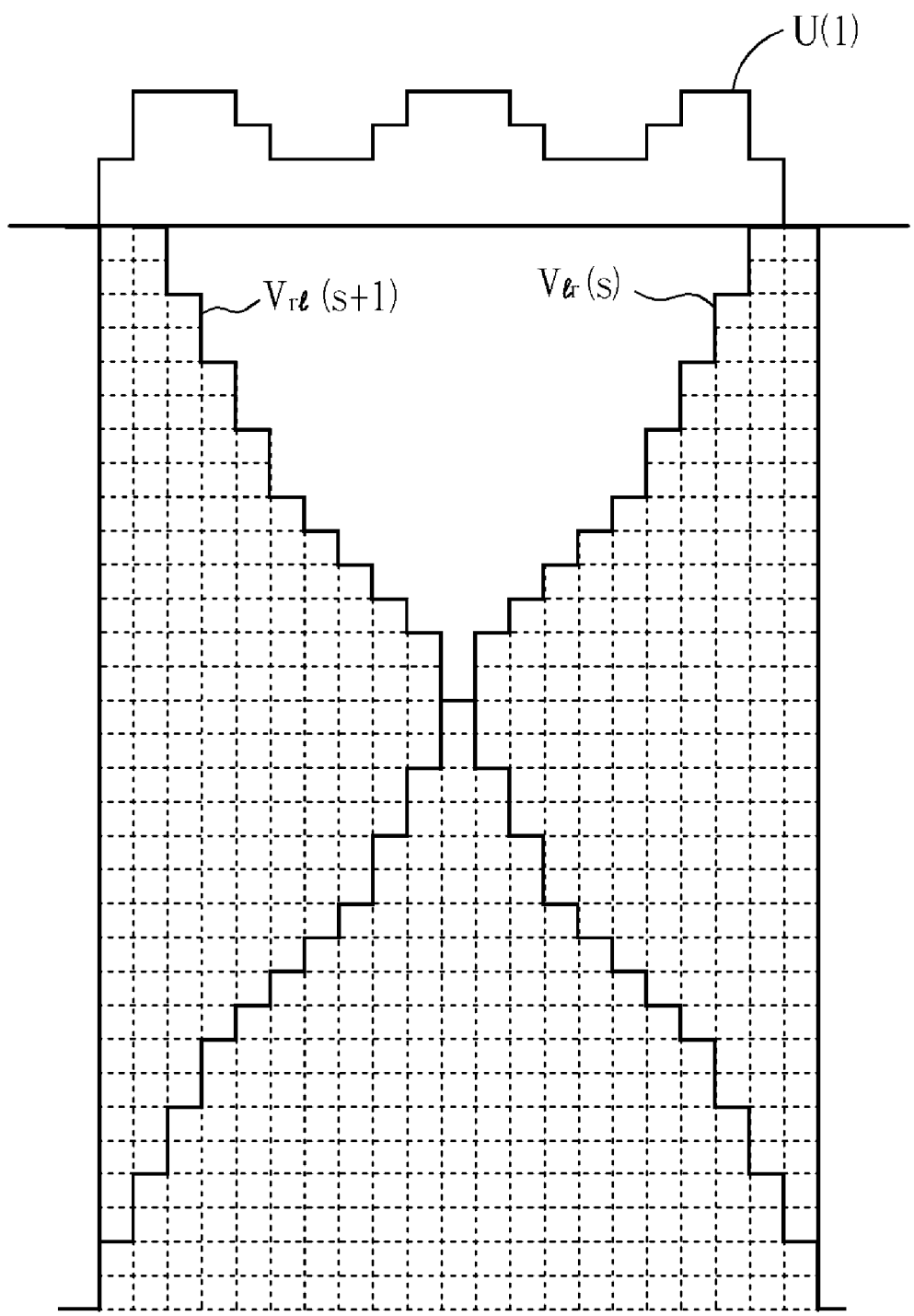
Figure 11:
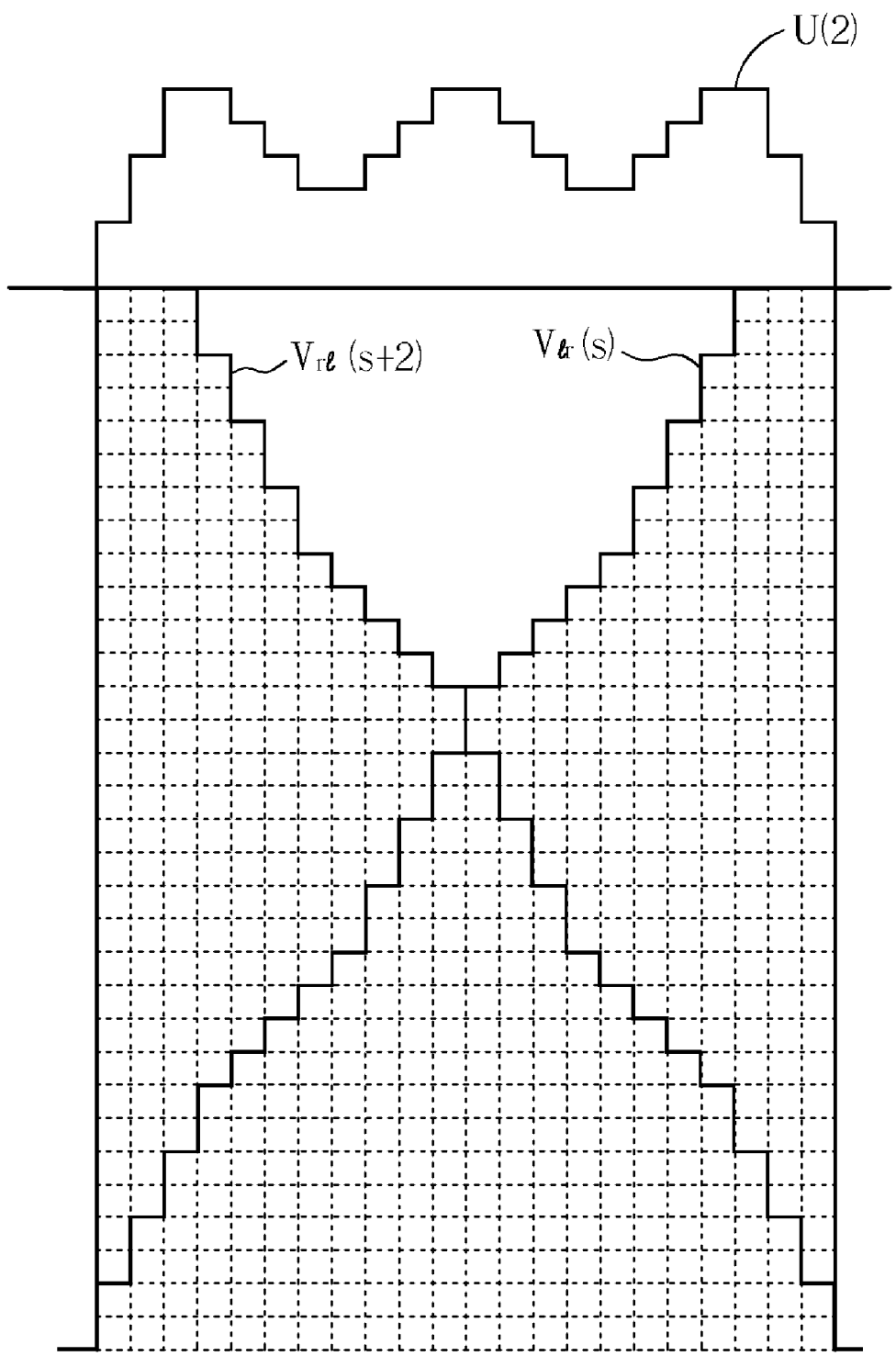

Please refer FIG. 8 to FIG. 12 for diagrams illustrating a method of calculating convergence parameters according to the present invention. In FIG. 8, $V_{rl}(s-1)$ is obtained by shifting $V_{rl}(s)$ by one unit towards the left, and $U(-1)$ is obtained by adding $V_{lr}(s)$ and $V_{rl}(s-1)$. In FIG. 9, $U(0)$ is obtained by adding $V_{lr}(s)$ and $V_{rl}(s)$. In FIG. 10, $V_{rl}(s+1)$ is obtained by shifting $V_{rl}(s)$ by one unit towards the right, and $U(1)$ is obtained by adding $V_{lr}(s)$ and $V_{rl}(s+1)$. In FIG. 11, $V_{rl}(s+2)$ is obtained by shifting $V_{rl}(s)$ by two units towards the right, and $U(2)$ is obtained by adding $V_{lr}(s)$ and $V_{rl}(s+2)$. In FIG. 10, $V_{rl}(s+3)$ is obtained by shifting $V_{rl}(s)$ by three units towards the right, and $U(3)$ is obtained by adding $V_{lr}(s)$ and $V_{rl}(s+3)$. $U(-1)$ to $U(3)$ can be represented by the following equations:

$$U(-1)=V_{lr}(s)+V_{rl}(s-1)$$
$$U(0)=V_{lr}(s)+V_{rl}(s)$$
$$U(1)=V_{lr}(s)+V_{rl}(s+1)$$
$$U(2)=V_{lr}(s)+V_{rl}(s+2)$$
$$U(3)=V_{lr}(s)+V_{rl}(s+3)$$

Figure 12:
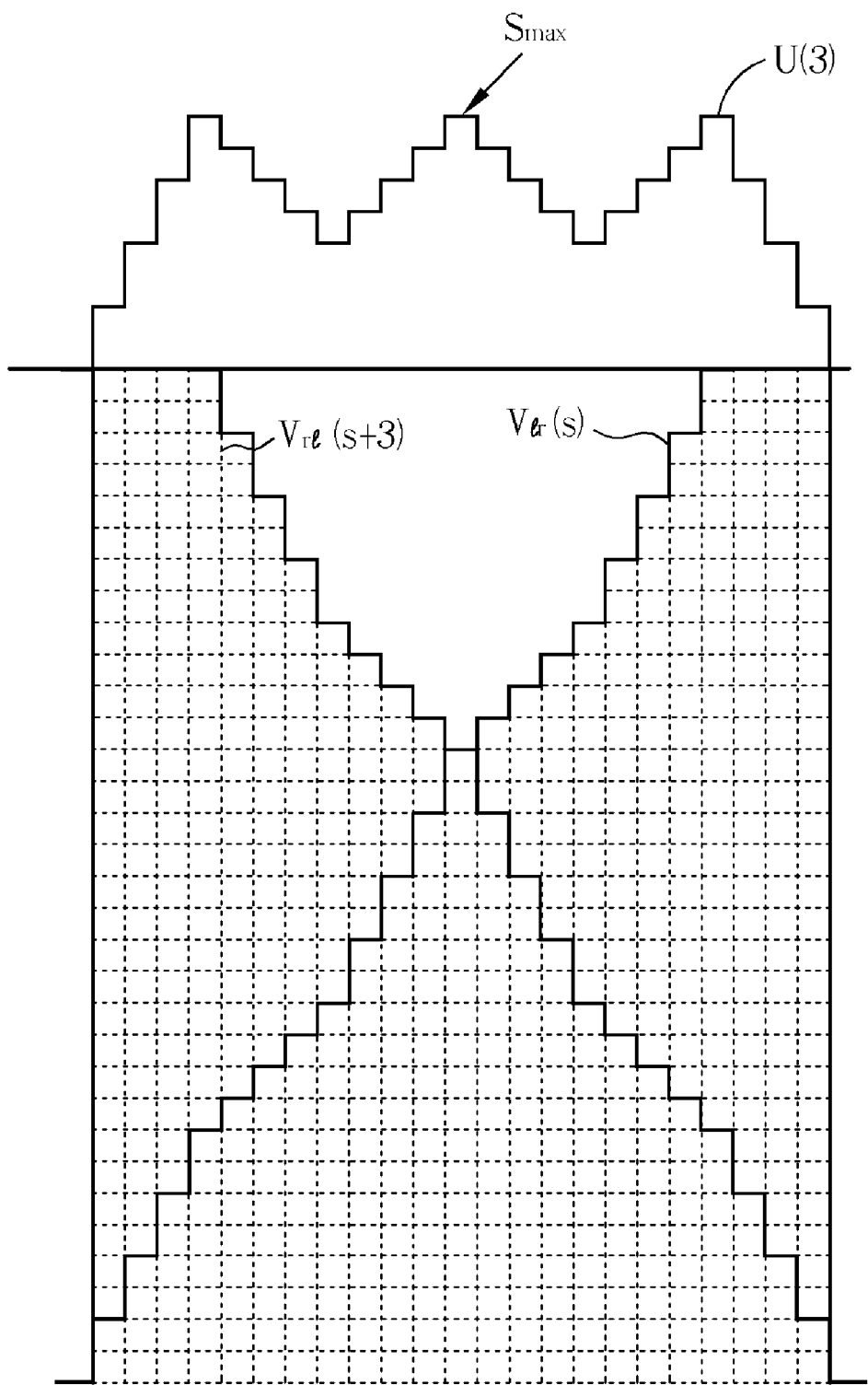

$U(-1)$ corresponds to the maximum voltage measured by the sensor T, $U(0)$ corresponds to the areas of each sensing region, and $U(1)$ to $U(3)$ correspond one to three step width project line charts. As shown in FIG. 12, a peak value representing the best sensing location Smax of the sensor T can be obtained from $U(3)$. Then the position difference between the origin factory setting and Smax can be calculated and adjusted.

The embodiments shown in FIG. 6 to FIG. 12 illustrate a convergence calibration method using a sensor T disposed at the upper side or the lower side of the screen. The present invention can also be applied to sensors disposed at other locations, such as at the right side or the left side of the screen. Also, the test patterns generated in the present invention can be red, green or blue images, and corresponding convergence parameters of each color can be calculated.

Compared to the prior art, the present invention performs digital convergence calibration based on the maximum energy measured by the sensor. Therefore, the non-linear relationship between the sensor output and the light wavelength does not affect the accuracy of the convergence calculation and adjustment. The present invention method implements a simple algorithm for calculating the convergence parameters. Also, the present invention convergence calibration method generates a test pattern of similar width with respect to the sensor and expands the area of the test pattern from one side of the sensor until the whole sensor is illuminated. As a result, the sensor measures voltages from test patterns that gradually increase in size. Therefore, larger illuminated areas lower the impact of background noises on the accuracy of the convergence calibration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing convergence calibration for a display using multiple beams to generate a video display on a screen, comprising the steps of:
   (a) projecting a reference pattern onto a sensor having a plurality of sensing sections and expanding a first area of the reference pattern from a first side of the sensor;
   (b) measuring first image signals with the plurality of sensing sections of the sensor from the reference pattern while performing step (a);
   (c) outputting first image signals measured by each of the plurality of sensing sections of the sensor in step (b);
   (d) projecting a reference pattern onto the sensor and expanding a second area of the reference pattern from a second side of a sensor;
   (e) measuring second image signals with the plurality of sensing sections of the sensor from the reference pattern while performing step (d);

(f) outputting second image signals measured by each of the plurality of sensing sections of the sensor in step (e); and (g) generating parameters of the display system based on a sum of the first and second image signals outputted in step (c) and (f) for adjusting images of the display.

2. The method of claim 1 wherein step (g) comprises the steps of:

(g1) outputting a sum of image signals measured by each of the plurality of sensing sections of the sensor in step (c) and image signals measured by each of the plurality of sensing sections of the sensor in step (f);

(g2) outputting a sum of a first image signal measured by a first sensing section of the sensor in step (c) and a second image signal measured by a second sensing section of the sensor in step (f), and outputting an image signal measured by a third sensing section of the sensor in step (c) and (f); and (g3) generating parameters of the display system based on image signals outputted in step (g1) and (g2).

3. The method of claim 2 further comprising:

outputting parameters generated in step (g3) to a convergence calibration circuit.

4. The method of claim 1 wherein step (a) expands the reference pattern from a left side of the sensor and step (d) expands the reference pattern from a right side of the sensor.

5. The method of claim 1 wherein step (a) expands the reference pattern from a right side of the sensor and step (d) expands the reference pattern from a left side of the sensor.

6. The method of claim 1 wherein step (a) expands the reference pattern from an upper side of the sensor and step (d) expands the reference pattern from a lower side of the sensor.

7. The method of claim 1 wherein step (a) expands the reference pattern from a lower side of the sensor and step (d) expands the reference pattern from an upper side of the sensor.

8. The method of claim 1 wherein step (a) expands a red reference pattern from the first side of the sensor and step (d) expands a red reference pattern from the second side of the sensor.

9. The method of claim 1 wherein step (a) expands a green reference pattern from the first side of the sensor and step (d) expands a green reference pattern from the second side of the sensor.

10. The method of claim 1 wherein step (a) expands a blue reference pattern from the first side of the sensor and step (d) expands a blue reference pattern from the second side of the sensor.

11. The method of claim 1 wherein the reference pattern includes red, blue and blue light.

12. The method of claim 1 wherein the display is a rear-projection cathode ray tube.

13. The method of claim 1 wherein the sensor is an optical sensor.

14. A method of performing convergence calibration for a display using multiple beams to generate a video display on a screen, comprising the steps of:

(a) projecting a reference pattern onto a sensor having a plurality of sensing sections and expanding a first area of the reference pattern from a first side of the sensor;

(b) measuring first image signals with the plurality of sensing sections of the sensor from the reference pattern while performing step (a);

(c) outputting first image signals measured by each of the plurality of sensing sections of the sensor in step (b);

(d) projecting a reference pattern onto the sensor and expanding a second area of the reference pattern from a second side of a sensor, wherein the first side of the sensor and the second side of the sensor are on opposite sides of the sensor;

(e) measuring second image signals with the plurality of sensing sections of the sensor from the reference pattern while performing step (d);

(f) outputting second image signals measured by each of the plurality of sensing sections of the sensor in step (e); and (g) generating parameters of the display system based on a sum of the first and second image signals outputted in step (c) and (f) for adjusting images of the display.

15. The method of claim 14 wherein step (a) expands the reference pattern from a left side of the sensor and step (d) expands the reference pattern from a right side of the sensor.

16. The method of claim 14 wherein step (a) expands the reference pattern from a right side of the sensor and step (d) expands the reference pattern from a left side of the sensor.

17. The method of claim 14 wherein step (a) expands the reference pattern from an upper side of the sensor and step (d) expands the reference pattern from a lower side of the sensor.

18. The method of claim 14 wherein step (a) expands the reference pattern from a lower side of the sensor and step (d) expands the reference pattern from an upper side of the sensor.

* * * * *